Figure 1:
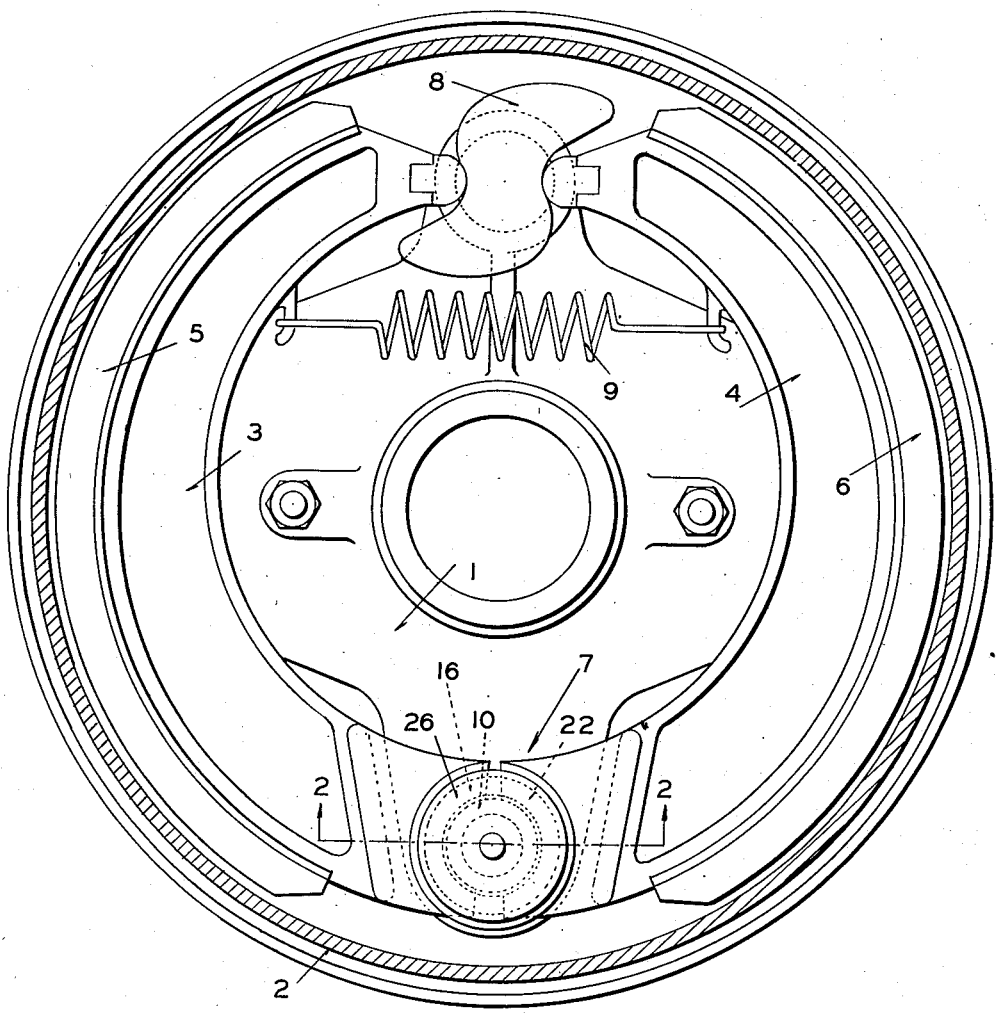

March 24, 1942.  W. F. BOLDT  2,277,577
BRAKE SHOE ANCHORING MEANS
Filed April 18, 1941  2 Sheets-Sheet 1

INVENTOR
W. F. BOLDT
BY
ATTORNEY

March 24, 1942. W. F. BOLDT 2,277,577
BRAKE SHOE ANCHORING MEANS
Filed April 18, 1941 2 Sheets-Sheet 2
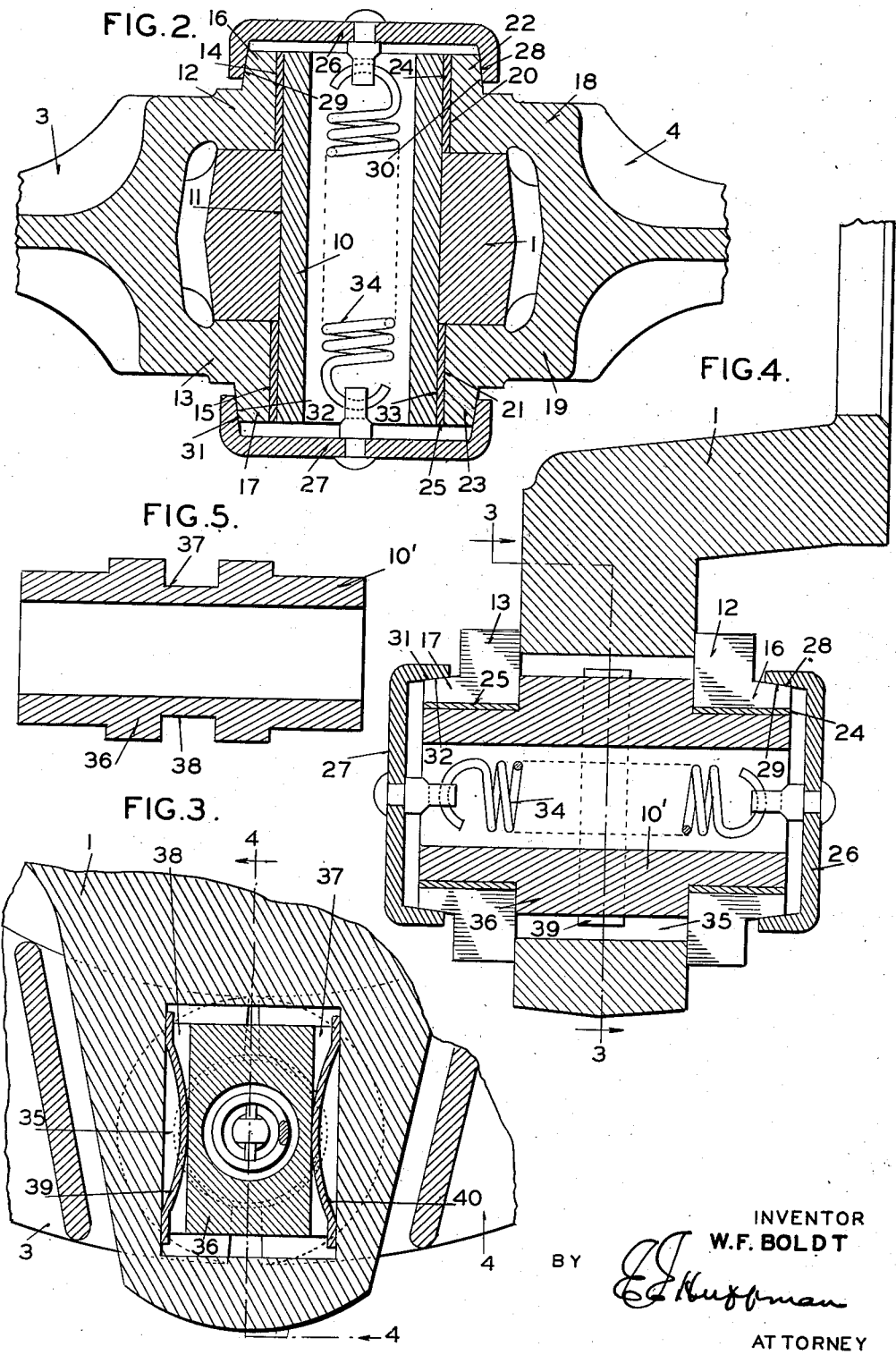
INVENTOR
W. F. BOLDT Patented Mar. 24, 1942

2,277,577

UNITED STATES PATENT OFFICE 2,277,577

BRAKE SHOE ANCHORING MEANS

Werner F. Boldt, Clayton, Mo., assignor to Wagner Electric Corporation, St. Louis, Mo., a corporation of Delaware Application April 18, 1941, Serial No. 389,136

10 Claims. (Cl. 188—79.5)

My invention relates to brakes and more particularly to improved anchoring means for the shoes thereof.

One of the objects of my invention is to provide improved means for anchoring the adjacent ends of two brake shoes on a single anchor pin.

Another object of my invention is to provide means for association with a pin and a semi-cylindrical bearing end of a brake shoe for holding said end of the shoe engaged with the pin and to also automatically compensate for any wear of the pin or shoe bearing.

Other objects of my invention will become apparent from the following description taken in connection with the accompanying drawings in which Figure 1 is a view of a two-shoe brake having anchoring means embodying my invention; Figure 2 is a sectional view taken on the line 2—2 of Figure 1; Figure 3 is a view of a portion of a brake showing a different anchoring means in which my invention is embodied, parts being shown in section with said section being taken on the line 3—3 of Figure 4; Figure 4 is a sectional view taken on the lines 4—4 of Figure 3; and Figure 5 is a longitudinal sectional view of the anchor pin.

Referring to Figures 1 and 2, the numeral 1 indicates a support for a brake assembly adapted to be secured to a fixed part of a vehicle and 2 a drum adapted to be secured to a wheel. Within the drum are two brake shoes 3 and 4 provided with linings 5 and 6, respectively, for engaging the drum. The shoes are pivotally mounted at their heel ends to the support by my improved anchor means generally indicated by the numeral 7. The toe ends of the shoes are adapted to be actuated in a well-known manner by any suitable means such as the cam 8 which can be operated from a remote point by suitable force transmitting means. The shoes are held in their normally retracted or inoperative position against the cam by the retracting spring 9.

The anchoring means embodying my invention comprises a cylindrical anchor pin 10 mounted in a hole 11 of a projection on the support and having portions extending on opposite sides thereof. The anchored or heel end of each shoe is of identical construction as best shown in Figure 2. The heel end of shoe 3 is bifurcated and the legs 12 and 13 fit on opposite sides of the projection of the support. The leg 12 is provided with a semi-cylindrical bearing surface 14 and leg 13 is provided with a semi-cylindrical bearing surface 15. These bearing surfaces engage opposite ends of pin 10. The leg 12 also has an integral outwardly extending semi-cylindrical flange 16 and a like flange 17 is integral with leg 13. The legs 18 and 19 at the heel end of shoe 4 fit on opposite sides of the projection of the support and engage opposite ends of the pin by semi-cylindrical bearing surfaces 20 and 21, respectively. Leg 18 has an integral semi-cylindrical flange 22 and leg 19 has a semi-cylindrical flange 23. If desired, the ends of the pin may carry bearing sleeves 24 and 25 as shown.

In a brake provided with anchoring means of the type just described, it is possible that the heel ends may move away from the anchor pin under certain conditions unless means are provided for preventing this. If such should occur, the shoe, when again caused to engage the pin, may do so with considerable force thereby resulting in some damage to the bearing surfaces or pin. In order to prevent this and to also insure that any wear between said surfaces and the pin due to their relative rotation will be compensated for, I have provided special means which will now be described.

A cup-shaped element 26 is employed to fit over the semi-cylindrical flanges 16 and 22 adjacent one end of the pin and a second cup-shaped element 27 is employed to fit over the semi-cylindrical flanges 17 and 23 adjacent the other end of the pin. The element 26 has an inclined inner wall 28 which is adapted to engage cooperating inclined surfaces 29 and 30 provided on the outer surfaces of flanges 16 and 22, respectively. The cup-shaped element 27 also has an inclined inner wall 31 which is adapted to engage cooperating inclined surfaces 32 and 33 provided on the outer surfaces of flanges 17 and 23. A strong coiled spring 34 is positioned in the hollow pin and has its ends connected to the cup-shaped elements 26 and 27. This spring biases the elements toward each other and maintains the cooperating inclined surfaces in engagement, said surfaces being so arranged that component force of the spring causes the bearing surfaces of the heel ends of the shoes to be held against the pin at all times.

By means of this structure it is seen that in the event of wear of the bearing surfaces or sleeves on the pin, such will be compensated for and no looseness can develop between the bearing surfaces and the pin which will permit a shoe to move away from the pin. Each cup-shaped element is so constructed that its base will be spaced from the end of the pin when originally installed, thus permitting it to move toward the shoe when permitted to do so by wear of the bearing surfaces or sleeves. Thus by means of my improved anchor means the shoes are prevented from moving away from the single pin at all times and notwithstanding wear of the engaging surfaces.

In the modified anchor means shown in Figures 3, 4, and 5, the projection on the support 1 of the brakes is provided with a radial slot 35 in which is positioned, for radial movement only, a hollow anchor pin 10' having a central square portion 36 to engage the side walls of the slot. The opposite sides of the square portion are provided with grooves 37 and 38 in which are positioned, respectively, leaf springs 39 and 40 cooperating with the base of the grooves and with the side walls of slot 34. These leaf springs produce friction between the anchor pins and the slot to thus frictionally maintain the pin in any position which it may assume during braking action. This construction permits automatic adjustment of the heel ends of the shoes to compensate for lining wear.

The heel ends of the brake shoes for engaging the pin are of the same construction as previously described and similar numerals indicate the parts. The semi-cylindrical bearing surfaces on the legs of each brake shoe engage opposite ends of the anchor pin 10'. The legs of the shoe are also provided with the same flanges having inclined surfaces and cooperating therewith are cup-shaped elements 26 and 27 for maintaining at all times the bearing surfaces of the shoes in engagement with the anchor pin notwithstanding wear of the surfaces in contact. The cup-shaped elements are biased toward each other by the coil spring 34 which is positioned in the hollow anchor pin 10'.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In apparatus of the class described, a pivot pin, a brake shoe having a semi-cylindrical bearing surface engaging the pin, said pin and shoe being capable of relative rotation, means comprising an element for preventing said shoe and pin from separating, and means comprising cooperating inclined surfaces on the element and shoe for automatically compensating for wear between the pin and semi-cylindrical bearing surface and causing the said bearing surface to be maintained at all times in engagement with the pin by said element.

2. In apparatus of the class described, a hollow pivot pin, two members each provided with a semi-cylindrical bearing surface for cooperating with opposite sides of the pin, each member also being provided with a semi-cylindrical flange extending laterally adjacent the bearing surface, a cup-shaped element fitting over the flanges on the members, and a coil spring positioned in the hollow pin and acting on the cup-shaped element to yieldably hold it in position.

3. In apparatus of the class described, a hollow pivot pin, two members each provided with a semi-cylindrical bearing surface for cooperation with opposite sides of the pin, each member also being provided with laterally extending flanges on each side thereof and adjacent the bearing surface, two cup-shaped elements, one fitting over the flanges of both members on one side and the other fitting over the flanges of both members on the other side to prevent movement of the members away from the pin, and a coil spring extending through the hollow pin and having its ends connected to the cup-shaped members to hold them in position.

4. In apparatus of the class described, a hollow pivot pin, two members each provided with a semi-cylindrical bearing surface for cooperation with opposite sides of the pin, each member also being provided with laterally extending flanges on each side thereof adjacent the bearing surface, cup-shaped elements on opposite sides of the members and each fitting over diametrically opposed flanges to prevent movement of the members away from the pin, and a coil spring extending through the hollow pin and having its ends connected to the cup-shaped members to hold them in position, said flanges and cup-shaped elements having cooperating inclined surfaces so arranged as to cause the elements to continue to maintain the bearing surfaces and the pin engaged in the event of wear due to relative rotation between the pin and members.

5. In braking apparatus, a support, an anchor pin carried by the support, two brake shoes each provided with an end bearing surface for engaging the pin, and means for holding the bearing surfaces from movement away from the pin and for automatically compensating for wear of the pin or bearing surfaces due to relative rotation to thereby maintain the bearing surfaces engaged with the pin at all times.

6. In braking apparatus, a support, an anchor pin carried by the support, two brake shoes each provided with an end bearing surface for engaging the pin, means for holding the bearing surfaces from movement away from the pin and for automatically compensating for wear of the pin or bearing surfaces due to relative rotation to thereby maintain the bearing surfaces engaged with the pin at all times, said means comprising inclined surfaces on the shoes, an element provided with cooperating inclined surfaces, and spring means for biasing the element toward the shoes, said inclined surfaces and spring means being so arranged that wear of the bearing surfaces or the pin will be taken up by relative movement of the cooperating inclined surfaces.

7. In braking apparatus, a support, a hollow anchor pin carried by the support and held against circumferential movement, two brake shoes each having a semi-cylindrical bearing surface engaging the anchor pin and a semi-cylindrical flange provided with an inclined surface, a cup-shaped element positioned over the flanges and having a conical surface on its inner wall for cooperation with the inclined surfaces of the flanges, and a coil spring positioned in the hollow anchor pin for applying an axial force to the cup to cause it to hold the bearing surfaces engaged with the pin and automatically compensate for wear of the pin or bearing surfaces.

8. In braking apparatus, a support, an anchor pin carried by the support, a brake shoe having a semi-cylindrical bearing surface at one end for engaging the pin and a laterally extending semi-cylindrical flange having an inclined surface on its side away from the pin, an element provided with a flange having an inclined inner surface cooperating with the inclined surface on the shoe, said element being so associated with the pin that the cooperating flanges will prevent movement of the shoe bearing surface away from the pin, and spring means for applying an axial force to the element so that wear of the pin or bearing surface will be automatically compensated for by relative axial movement between the cooperating inclined surfaces.

9. In braking apparatus, a support, a hollow anchor pin carried by the support and extending on each side thereof, two brake shoes, each having a forked end straddling the support and each leg of each end having a semi-cylindrical bearing surface for engaging opposite end portions of the anchor pin, each of the legs of each shoe end provided with an outwardly extending semi-cylindrical flange having an inclined surface on the side away from the anchor pin, two cup-shaped elements each having a conical surface on its inner wall, one of said cups receiving the flanges adjacent one end of the pin and the other receiving the flanges adjacent the other end of the pin, and a coil spring positioned in the hollow pin and having its ends secured to the cups so as to apply an axial force to the cups tending to move them toward each other.

10. In braking apparatus, a support provided with a slot, a pin positioned in the slot, yieldable means cooperating with the support and pin for producing a frictional resistance to movement of the pin in the slot, two brake shoes each having a semi-cylindrical bearing surface at one end for engaging the pin and a laterally extending semi-cylindrical flange, a cup-shaped element fitting over the flanges to prevent movement of the shoes away from the pin, said element and the flanges having cooperating inclined surfaces, and spring means acting on the element to bias it axially toward the shoes whereby the inclined surfaces will be caused to have relative movement and thus cause the bearing surfaces to be maintained in continuous engagement with the pin in the event of wear due to relative rotation of the pin and shoes.

WERNER F. BOLDT.